No. 843,094. PATENTED FEB. 5, 1907.
J. PATERSON & G. K. PASLEY.
COMBINED SEAT AND LUGGAGE CARRIER FOR BICYCLES.
APPLICATION FILED APR. 24, 1905.

UNITED STATES PATENT OFFICE.

JAMES PATERSON AND GILBERT KENNEDY PASLEY, OF GISBORNE, NEW ZEALAND.

COMBINED SEAT AND LUGGAGE-CARRIER FOR BICYCLES.

No. 843,094. Specification of Letters Patent. Patented Feb. 5, 1907.

Application filed April 24, 1905. Serial No. 257,257.

*To all whom it may concern:*

Be it known that we, JAMES PATERSON and GILBERT KENNEDY PASLEY, subjects of the King of Great Britain, residing at Gisborne, in the Colony of New Zealand, have invented a new and useful Combined Seat and Luggage-Carrier for Use with Bicycles, of which the following is a specification.

This invention relates to a combined child's seat and luggage-carrier for use with bicycles, and has for its object to provide a simple and effective device which can be attached to and detached from a bicycle with facility.

According to the invention we construct our improved seat and carrier of a seat proper of any suitable material—such as wood, woven wire, or metal—and the shape of which is somewhat similar to that of a child's chair having recesses to receive the legs. To this seat are loosely attached arm-rests or rails of steel or other wire, the said arm-rests being hinged to uprights having hooked ends, so that they can be suspended to the handle-bar of the bicycle, the lower ends of the said uprights being provided with means, such as nuts, by which the point of connection to the seat can be adjusted to suit requirements. The seat is also provided on its under side with clips or the like for retaining the arm-rests close to the seat when the device is to be used as a seat for a child. To the front of the seat is hinged a looped device which when turned down serves as a foot-rest for the occupier of the seat and when turned upward as a front guard for the parcels or the like placed upon the seat. Beneath the seat we advantageously attach one or more wire springs, the free ends of which abut against the pedestal or fork of the bicycle.

To enable the invention to be fully understood, we will describe it by reference to the accompanying drawings, in which—

Figure 1:
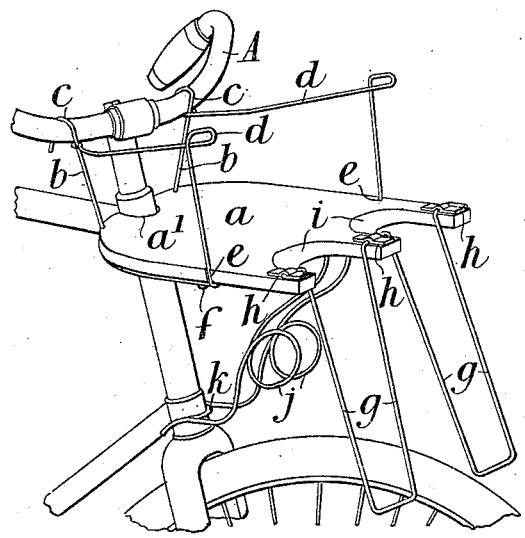
Figure 2:
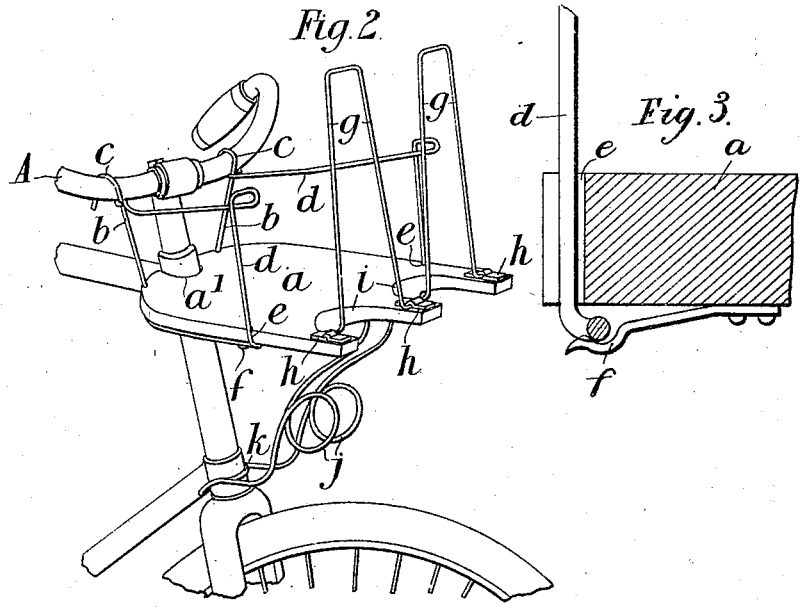
Figure 3:
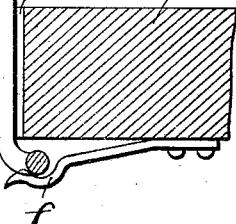

Figure 1 is a perspective view illustrating our device attached to a bicycle and adapted for use as a child's seat; and Fig. 2 is a view similar to Fig. 1, showing the device arranged for use as a luggage-carrier. Fig. 3 is a detail view illustrating the catch for retaining the arms in operative position.

$a$ represents the seat, which is here shown of wood, although it can be of other suitable material, as above described, and is recessed at $a'$ at the rear part to receive the steering-head of the bicycle.

$b\ b$ represent the uprights, to the lower ends of which the seat is suspended, say, through the medium of nuts which engage the screw-threaded lower ends of the said uprights.

$c\ c$ are the hooks, which are formed upon the upper ends of the uprights $b$ and which are designed to fit over the handle-bar A of the bicycle, as shown.

$d\ d$ are the arm-rests, each of which is made of a length of wire bent to form three sides of a rectangle, the two free ends being loosely connected to the corresponding upright $b$, so that they can turn upon the said upright as a hinge.

When the arms are turned inward to serve as arm-rests for the occupant of the seat, they engage lateral notches $e\ e$ in the said seat $a$ and are retained therein by means of catches placed beneath the seat $a$ and one of which is indicated at $f$. One of these catches is shown in detail in Fig. 3, and it consists of a piece of spring metal secured to the bottom of the seat $a$ and having a locking-notch to engage the bottom bar of the arm-rest $d$.

$g\ g$ are two loops forming the two foot-rests, which are made from a single length of wire hinged at $h\ h\ h$ of the seat $a$ in front of two recesses $i\ i$, which are formed therein to receive the legs of the child occupying the seat.

As above described, Fig. 1 shows the device for use as a seat for a child. When it is to be used as a carrier, the looped wire $g\ g$ is turned upward into the position shown in Fig. 2, so as to form a front guard for holding the luggage in place upon the seat. By releasing the catches $f$ the arms $d\ d$ can be turned outward upon the uprights $b\ b$, thus permitting of the expansion of the device to take luggage of larger width than that of the seat.

$j\ j$ are two springs which are attached beneath the seat $a$. These springs are formed from a single piece of wire made with a fork $k$ at its lower end for engaging with the lower part of the steering-head of the bicycle.

Having now particularly described and ascertained the nature of our said invention and in what manner the same is to be performed, we declare that what we claim is—

1. A combined child's seat and luggage-carrier, comprising among its members, a seat portion, means for supporting it from the bicycle, an arm portion at each side of the seat hinged adjacent to the rear of the seat and means for locking said arm portions in operative position, substantially as described.

2. A combined child's seat and luggage-carrier, comprising among its members, a seat portion, uprights at the rear of the seat portion constructed to engage the handle-bar, lateral arm portions hinged to said uprights and catches adjacent to the front end of said seat portion for locking the arm portions in operative position, substantially as described.

3. A combined child's seat and luggage-carrier, comprising among its members a seat portion, uprights at the rear of the seat portion constructed to engage the handle-bar, lateral arm portions hinged to said uprights, catches adjacent to the front end of the seat portion for locking the arm portions in operative position and a foot-rest hinged to the front portion of the seat, substantially as described.

4. A combined child's seat and luggage-carrier comprising among its members, a seat recessed at its rear end to fit the steering-post of a bicycle, upright supports secured to the rear part of the seat and terminating in hooks to engage the handle-bars, lateral arm portions hinged to said uprights, catches secured to the seat adjacent to its front end for locking the hinged arms in operative position, a hinged foot-rest secured to the front of the seat, and a spring-support secured to the front portion of the seat and having a forked portion for engaging the steering-post, substantially as described.

JAMES PATERSON.
GILBERT KENNEDY PASLEY.

Witnesses:
  W. SIEVWRIGHT,
  CHAS. BUSCKE.
  W. MUIR.